United States Patent
Zhang et al.

(10) Patent No.: US 11,437,036 B2
(45) Date of Patent: Sep. 6, 2022

(54) SMART SPEAKER WAKE-UP METHOD AND DEVICE, SMART SPEAKER AND STORAGE MEDIUM

(71) Applicant: Baidu Online Network Technology (Beijing) Co., Ltd., Beijing (CN)

(72) Inventors: Xiangdang Zhang, Beijing (CN); Xing Luo, Beijing (CN); Xiangdong Xue, Beijing (CN); Guohui Zhou, Beijing (CN); Wenjie Liao, Beijing (CN)

(73) Assignees: Baidu Online Network Technology (Beijing) Co., Ltd., Beijing (CN); Shanghai Xiaodu Technology Co., Ltd., Shanghai (CN)

( * ) Notice: Subject to any disclaimer, the term of this patent is extended or adjusted under 35 U.S.C. 154(b) by 189 days.

(21) Appl. No.: 16/886,935

(22) Filed: May 29, 2020

(65) Prior Publication Data
US 2021/0151048 A1 May 20, 2021

(30) Foreign Application Priority Data
Nov. 18, 2019 (CN) .......................... 201911128667.9

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
USPC .......................... 704/246, 247, 251, 252, 275
See application file for complete search history.

(56) References Cited

U.S. PATENT DOCUMENTS

| | | | |
|---|---|---|---|
| 2019/0139541 A1* | 5/2019 | Andersen | G10L 15/1815 |
| 2019/0333503 A1* | 10/2019 | Kumetani | G06F 3/167 |
| 2020/0020329 A1* | 1/2020 | Gordon | G10L 25/51 |
| 2020/0027456 A1* | 1/2020 | Kim | G06N 5/025 |
| 2020/0091959 A1* | 3/2020 | Curtis | H04N 5/607 |
| 2020/0244788 A1* | 7/2020 | Adams | H04M 1/271 |
| 2021/0272564 A1* | 9/2021 | Kamada | G06F 3/167 |

* cited by examiner

Primary Examiner — Leonard Saint Cyr
(74) Attorney, Agent, or Firm — Harness, Dickey & Pierce, P.L.C.

(57) ABSTRACT

The present disclosure discloses a smart speaker wake-up method, a smart speaker wake-up device, a smart speaker and a storage medium, relates to the technical field of speech recognition. The method of the present disclosure is applied to a wireless network including two or more smart speakers, and a specific implementation thereof is: receiving, speech information including a wake-up word; performing a recognition processing to the speech information to obtain identification information corresponding to the wake-up word; and waking up one smart speaker in the wireless network to enter listening state according to the identification information. The present disclosure may be applied to a scenario where multiple smart speakers coexist, so as to quickly select one smart speaker that is most likely to be wakened, avoiding a chaotic speech interaction caused by multiple smart speakers being wakened simultaneously, improving efficiency and quality of speech interaction and achieving better user experience.

20 Claims, 5 Drawing Sheets

SMART SPEAKER WAKE-UP METHOD AND DEVICE, SMART SPEAKER AND STORAGE MEDIUM

CROSS-REFERENCE TO RELATED APPLICATIONS

The present application claims priority to Chinese Patent Application No. 201911128667.9 filed on Nov. 18, 2019, the content of which is hereby incorporated by reference in its entirety.

TECHNICAL FIELD

The present disclosure relates to speech recognition technologies in the technical field of data processing and, in particular, to a smart speaker wake-up method, a smart speaker wake-up device, a smart speaker and a storage medium.

BACKGROUND

With the continuous development of speech recognition technologies, increasingly devices have a speech recognition function set therein. A smart speaker has a powerful speech recognition function, in which various operations can be implemented via a speech interaction with the user.

Currently, when multiple smart speakers coexist, if the user sends out speech information including a wake-up word, the multiple speakers will response to the wake-up word simultaneously, which make the multiple speakers stay in a listening state.

However, if the multiple speakers stay in the listening state simultaneously, it will lead to a chaotic speech interaction, making the live speech broadcast environment noisy and causing a bad user experience.

SUMMARY

The present disclosure provides a smart speaker wake-up method, a smart speaker wake-up device, a smart speaker and a storage medium, which may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

In a first aspect, embodiments of the disclosure provide a smart speaker wake-up method, which is applied to a wireless network including two or more smart speakers, including:

receiving speech information including a wake-up word;

performing a recognition processing to the speech information to obtain identification information corresponding to the wake-up word; and waking up one smart speaker in the wireless network to enter listening state according to the identification information.

In the present embodiment, by means of receiving speech information including a wake-up word, performing a recognition processing to the speech information to obtain identification information corresponding to the wake-up word, and waking up one smart speaker in the wireless network to enter listening state according to the identification information, the smart speaker wake-up method may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

In a possible design, the performing a recognition processing to the speech information to obtain identification information corresponding to the wake-up word, includes:

recognizing the wake-up word from the speech information and recording a first timestamp corresponding to the recognition of the wake-up word.

In the present embodiment, when the user sends out the speech information including the wake-up word, the smart speaker may recognize the wake-up word in the speech information via a speech algorithm, and then record time of recognizing the wake-up word as the first timestamp. All of the smart speakers in the wireless network would record the first timestamp for marking time at which the speech information is received and the wake-up word in the speech information is recognized.

In a possible design, before the waking up one smart speaker in the wireless network to enter listening state according to the identification information, also including:

transmitting the first timestamp to other smart speakers in the wireless network by way of broadcasting; and receiving a second timestamp transmitted by other smart speakers in the wireless network, wherein the second timestamp is referred to as time corresponding to a recognition of the wake-up word by other smart speakers.

In the present embodiment, when the wake-up word is recognized from the speech information via the speech algorithm by the smart speaker, the smart speaker may transmit the time corresponding to the recognition of the wake-up word to other smart speakers in the wireless network by way of broadcasting. Other smart speakers will record the received time as the second timestamp. When there are multiple smart speakers in the wireless network, each of the smart speakers may receive the time transmitted by other smart speakers for many times, therefore there may multiple second timestamps being recorded.

In a possible design, the waking up one smart speaker in the wireless network to enter listening state according to the identification information includes:

comparing the time corresponding to the first timestamp with the time corresponding to the second timestamp;

giving up to wake up if the time of at least one second timestamp is earlier than the time of the first timestamp; and waking up to enter the listening state if none of the time of the second timestamp is earlier than the time of the first timestamp.

In the present embodiment, each of the smart speakers in the wireless network implements a task of comparing the first timestamp with the second timestamp, gives up to wake up if the time of at least one second timestamp is earlier than the time of the first timestamp, and wakes up to enter the listening state if none of the time of the second timestamp is earlier than the time of the first timestamp. By this way, the smart speaker can be wakened according to the time at which the wake-up word is obtained, an earlier time of obtaining the wake-up word illustrates a shorter distance between the smart speaker and the user. Therefore, the smart speaker closest to the user can be wakened from the wireless network to enter the listening state, thereby avoiding a chaotic speech interaction caused by multiple smart speakers being wakened simultaneously, improving efficiency and quality of speech interaction and achieving better user experience.

In a possible design, the performing a recognition processing to the speech information to obtain identification information corresponding to the wake-up word, includes:

recognizing the wake-up word from the speech information, and recording a first speech intensity corresponding to the wake-up word.

In the present embodiment, when the user sends out the speech information including the wake-up word, the smart speaker may recognize the wake-up word in the speech information via the speech algorithm, and then record speech intensity of the recognized wake-up word. All of the smart speakers in the wireless network would record the first speech intensity, where the first speech intensity represents the distance between the smart speaker and the user, the higher the speech intensity, the less the damage of the sound during transmission and the shorter the distance between the smart speaker and the user.

In a possible design, before the waking up one smart speaker in the wireless network to enter listening state according to the identification information, also including:

transmitting the first speech intensity to other smart speakers in the wireless network by way of broadcasting; and receiving a second speech intensity transmitted by other smart speakers in the wireless network, wherein the second speech intensity is referred to as a speech intensity corresponding to a recognized wake-up word by other smart speakers.

In the present embodiment, when the wake-up word is recognized from the speech information via the speech algorithm by the smart speaker, the smart speaker may transmit the speech intensity corresponding to the recognized wake-up word to other smart speakers in the wireless network by way of broadcasting. Other smart speakers would record the received speech intensity as the second speech intensity. When there are multiple smart speakers in the wireless network, each of the smart speakers may receive the second speech intensity transmitted by other smart speakers for many times, therefore there may multiple second speech intensity being recorded.

In a possible design, the waking up one smart speaker in the wireless network to enter listening state according to the identification information, includes:

comparing the first speech intensity with the second speech intensity;

giving up to wake up if at least one second speech intensity is larger than the first speech intensity; and waking up to enter the listening state if none of the second speech intensity is larger than the first speech intensity.

In the present disclosure, each of the smart speakers in the wireless network implements a task of comparing the first speech intensity with the second speech intensity, gives up to wake up if at least one second speech intensity is larger than the first speech intensity, and wakes up to enter the listening state if none of the second speech intensity is larger than the first speech intensity. By this way, the smart speaker can be wakened according to the speech intensity of the obtained wake-up word, a higher speech intensity corresponding to the wake-up word illustrates a shorter distance between the smart speakers and the user. Therefore, the smart speaker closest to the user can be wakened from the wireless network to enter the listening state, thereby avoiding a chaotic speech interaction caused by multiple smart speakers being wakened simultaneously, improving efficiency and quality of speech interaction and achieving better user experience.

In a possible design, the smart speaker in the wireless network is located in a preset geographic range, and there exist at least two smart speakers with different account numbers in the wireless network.

The present embodiment can be applied to the wireless network including two or more smart speakers, where the smart speakers in the wireless network are located in a preset geographic range, and there exist at least two smart speakers with different account numbers in the wireless network. By comparing the time at which the wake-up word is obtained or the speech intensity of the wake-up word, one smart speaker that is most likely to be wakened by the user can be selected quickly, avoiding a chaotic speech interaction caused by multiple smart speakers being wakened simultaneously, improving efficiency and quality of speech interaction and achieving better user experience.

In a second aspect, embodiments of the present disclosure provide a smart speaker wake-up device, which is applied to the wireless network including two or more smart speakers, including:

a receiving module, configured to receive speech information including a wake-up word;

a recognition module, configure to perform a recognition processing to the speech information to obtain identification information corresponding to the wake-up word; and a wake-up module, configured to wake up one smart speaker in the wireless network to enter listening state according to the identification information.

In the present embodiment, by means of receiving speech information including a wake-up word, performing a recognition processing to the speech information to obtain identification information corresponding to the wake-up word, and waking up one smart speaker in the wireless network to enter listening state according to the identification information, the smart speaker wake-up method may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

In a possible design, the recognition module is specifically configured to:

recognize the wake-up word from the speech information and record the first timestamp corresponding to the recognition of the wake-up word.

In the present embodiment, when the user sends out the speech information including the wake-up word, the smart speaker may recognize the wake-up word in the speech information via the speech algorithm, and then record time of recognizing the wake-up word as the first timestamp. All of the smart speakers in the wireless network would record the first timestamp for marking the time at which the speech information is received and the wake-up word in the speech information is recognized.

In a possible design, the device also includes:

a transmitting module, configured to transmit the first timestamp to other smart speakers in the wireless network by way of broadcasting; and a receiving module, configured to receive a second timestamp transmitted by other smart speakers in the wireless network, wherein the second timestamp is referred to as time corresponding to a recognition of the wake-up word by other smart speakers.

In the present embodiment, when the wake-up word is recognized from the speech information via the speech algorithm by the smart speaker, the smart speaker may transmit the time corresponding to the recognition of the wake-up word to other smart speakers in the wireless network by way of broadcasting. Other smart speakers will record the received time as the second timestamp. When there are multiple smart speakers in the wireless network, each of the smart speakers may receive the time transmitted by other smart speakers for many times, therefore there may multiple second timestamps being recorded.

In a possible design, the wake-up module is specifically configured to:

compare the time corresponding to the first timestamp with the time corresponding to the second timestamp;

give up to wake up if the time of at least one second timestamp is earlier than the time of the first timestamp; and wake up to enter the listening state if none of the time of the second timestamp is earlier than the time of the first timestamp.

In the present embodiment, each of the smart speakers in the wireless network implements the task of comparing the first timestamp with the second timestamp, gives up to wake up if the time of at least one second timestamp is earlier than the time of the first timestamp, and wakes up to enter the listening state if none of the time of the second timestamp is earlier than the time of the first timestamp. By this way, the smart speaker can be wakened according to the time at which the wake-up word is obtained, an earlier time of obtaining the wake-up word illustrates a shorter distance between the smart speaker and the user. Therefore, the smart speaker closest to the user can be wakened from the wireless network to enter the listening state, thereby avoiding a chaotic speech interaction caused by multiple smart speakers being wakened simultaneously, improving efficiency and quality of speech interaction and achieving better user experience.

In a possible design, the recognition module is specifically configured to:

recognize the wake-up word from the speech information and record a first speech intensity corresponding to the wake-up word.

In the present embodiment, when the user sends out the speech information including the wake-up word, the smart speaker may recognize the wake-up word in the speech information via the speech algorithm, and then record the speech intensity of the recognized wake-up word. All of the smart speakers in the wireless network would record the first speech intensity, where the first speech intensity represents the distance between the smart speaker and the user, the higher the speech intensity, the less the damage of the sound during transmission and the shorter the distance between the smart speaker and the user.

In a possible design, the device also includes:

a transmitting module, configured to transmit the first speech intensity to other smart speakers in the wireless network by way of broadcasting; and a receiving module, configured to receive a second speech intensity transmitted by other smart speakers in the wireless network, wherein the second speech intensity is referred to as a speech intensity corresponding to a recognized wake-up word by other smart speakers.

In the present embodiment, when the wake-up word is recognized from the speech information via the speech algorithm by the smart speaker, the smart speaker may transmit the speech intensity corresponding to the recognized wake-up word to other smart speakers in the wireless network by way of broadcasting. Other smart speakers would record the received speech intensity as the second speech intensity. When there are multiple smart speakers in the wireless network, each of the smart speakers may receive the second speech intensity transmitted by other smart speakers for many times, therefore there may multiple second speech intensity being recorded.

In a possible module, the wake-up module is specifically configured to:

compare the first speech intensity with the second speech intensity;

give up to wake up if at least one second speech intensity is larger than the first speech intensity; and wake up to enter the listening state if none of the second speech intensity is larger than the first speech intensity.

In the present disclosure, each of the smart speakers in the wireless network implements a task of comparing the first speech intensity with the second speech intensity, gives up to wake up if at least one second speech intensity is larger than the first speech intensity, and wakes up to enter the listening state if none of the second speech intensity is larger than the first speech intensity. By this way, the smart speaker can be wakened according to the speech intensity of the obtained wake-up word, a higher speech intensity corresponding to the wake-up word illustrates a shorter distance between the smart speakers and the user. Therefore, the smart speaker closest to the user can be wakened from the wireless network to enter the listening state, thereby avoiding a chaotic speech interaction caused by multiple smart speakers being wakened simultaneously, improving efficiency and quality of speech interaction and achieving better user experience.

In a possible design, the smart speaker in the wireless network is located in the preset geographic range, and there exist at least two smart speakers with different account numbers in the wireless network.

The present embodiment can be applied to the wireless network including two or more smart speakers, where the smart speakers in the wireless network are located in a preset geographic range, and there exist at least two smart speakers with different account numbers in the wireless network. By comparing the time at which the wake-up word is obtained or the speech intensity of the wake-up word, one smart speaker that is most likely to be wakened by the user can be selected quickly, avoiding a chaotic speech interaction caused by multiple smart speakers being wakened simultaneously, improving efficiency and quality of speech interaction and achieving better user experience.

In a third aspect, the present disclosure provides a smart speaker, including a processor and a memory, where the memory stores instruction executable by the at least one processor, the processor is configured to implement the smart speaker wake-up method according to the first aspect or any possible design of the first aspect by executing the executable instruction.

In a fourth aspect, the present disclosure provides a computer readable storage medium having a computer program stored therein, where the smart speaker wake-up method according to the first aspect or any possible design of the first aspect is implemented when the program is executed by the processor.

In a fifth aspect, embodiments of the present disclosure provides a program product including: a computer program stored in a readable storage medium, where at least one processor of a server can read the computer program from the readable storage medium, and the at least one processor executes the computer program to make the server implements the smart speaker wake-up method according to the first aspect or any possible design of the first aspect.

In a sixth aspect, embodiments of the present disclosure provide a smart speaker wake-up method, including:

receiving speech information; and waking up, if the speech information includes a wake-up word, one smart speaker in the wireless network to enter listening state according to identification information corresponding to the wake-up word.

In the present embodiment, by means of receiving speech information, and waking up, if the speech information includes a wake-up word, one smart speaker in the wireless network to enter listening state according to identification information corresponding to the wake-up word, the smart speaker wake-up method may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

The above-described embodiments of the present disclosure have advantages or beneficial effects as below: capable of being applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience. By means of the technical means including receiving speech information including a wake-up word, performing a recognition processing to the speech information to obtain identification information corresponding to the wake-up word, and waking up one smart speaker in the wireless network to enter listening state according to the identification information, the technical problem of a chaotic speech interaction caused by multiple smart speakers being wakened simultaneously is overcame, and one smart speaker that is most likely to be wakened by the user is selected according to the identification information corresponding to the wake-up word, thereby obtaining the technical effects of improving efficiency and quality of the speech interaction and achieving better user experience.

Other effects of the above-described optional implementations will be illustrated below in combination with specific embodiments.

BRIEF DESCRIPTION OF DRAWINGS

The accompanying drawings are used for a better comprehension of the present solution, but not construed as limiting the present disclosure. Where.

DESCRIPTION OF EMBODIMENTS

Figure 1:
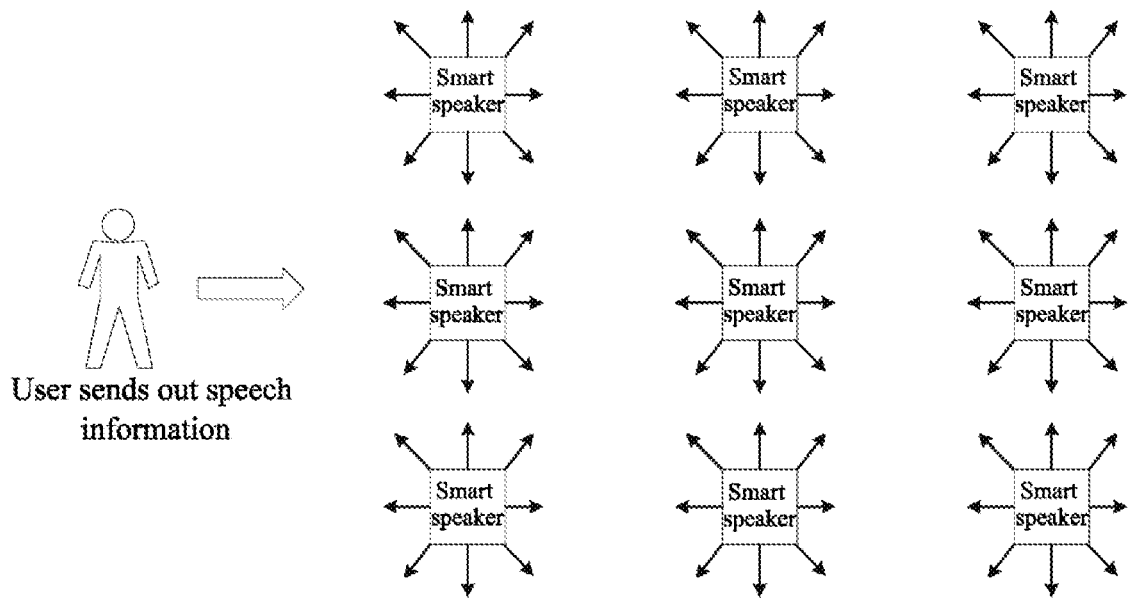
FIG. 1 is a schematic diagram of a principle for implementing a smart speaker wake-up method according to embodiments of the present disclosure.

Exemplary embodiments of the present disclosure will be illustrated below in combination with the accompany drawings, various details of embodiments of the present disclosure are included therein for helping to comprehend, which should be understood merely as exemplary. Therefore, those skilled in the art should recognize that various changes and modifications may be made to the embodiments described herein without departing from scope and spirit of the present disclosure. Meanwhile, for the purpose of clarity and conciseness, description of common function and structure will be omitted in the description below.

The terms of "first", "second", "third", "fourth" and the like (if exist) in the specification, the claims and the above-described accompanying drawings are used to distinguish similar objects, but not necessarily describe a specific sequence or a specific order. It should be understood that the terms used in this way can be interchanged in appropriate cases, so as to make embodiments of the present disclosure can be implemented in a sequence in addition to those illustrated or described herein. In addition, the terms of "comprise/includes" "have" and any other variations thereof are intended to cover an non-exclusive inclusion, for example, a process, a method, a system, a product or a device which includes a serial of steps or units is not necessarily limited to those steps or units being listed clearly, but may include other steps or units that haven't been clearly listed or that are inherent for these process, method, system, product or device.

Technical solution of the present disclosure will be described in detail below with specific embodiments. Several specific embodiments below may be mutually combined, and the same or similar concepts or processes may not be described repeatedly in some embodiments.

With the continuous development of speech recognition technologies, increasingly device has a speech recognition function set therein. A smart speaker has a powerful speech recognition function, in which various operations can be implemented via a speech interaction with the user. Currently, when multiple smart speakers coexist, if the user sends out speech information including a wake-up word, the multiple speakers will response to the wake-up word simultaneously, which make the multiple speakers stay in a listening state. However, if the multiple speakers stay in the listening state simultaneously, it will lead to a chaotic speech interaction, making the live speech broadcast environment noisy and causing a bad user experience.

Aiming at the above-described technical problem, the present disclosure provides a smart speaker wake-up method, a smart speaker wake-up device, a smart speaker and a storage medium, which may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

FIG. 1 is a schematic diagram of a principle for implementing a smart speaker wake-up method according to embodiments of the present disclosure. As shown in FIG. 1, in the scenario that multiple smart speakers coexist, multiple smart speakers are connected together via a wireless network. When the user sends out speech information, all of the smart speakers in the wireless network can receive the speech information including the wake-up word. And then the smart speaker performs a recognition processing to the speech information to obtain identification information corresponding to the wake-up word. The identification information may be information including a timestamp of receiving the wake-up message by a speech algorithm database, speech intensity of the wake-up word, a node address and the like. For example, the smart speaker may recognize the wake-up word in the speech information via a speech algorithm, and then record the speech intensity of the recognized wake-up word, time at which the wake-up word is recognized and the like. All of the smart speakers in the wireless network would record a first speech intensity and a first timestamp. The first speech intensity represents a distance between the smart speaker and the user, the higher the speech intensity, the less the damage of the sound during transmission and the shorter the distance between the smart speaker and the user. The first timestamp is used for marking the time at which the speech information is received and the wake-up word in the speech information is recognized. And then, the smart speaker transmits the identification information to other smart speakers located in the same wireless network by way of broadcasting. Meanwhile, the smart speaker also receives the identification information transmitted by other smart speakers in the wireless network. Each node of the smart speakers can transmit this kind of information via the wireless network, where the size of package should comply with rules and requirements of the wireless network. And then, according to a preset rule, the smart speaker compares the identification information of itself with the received identification information transmitted by other smart speaker and make a determination, so that one smart speaker in the wireless network is wakened to enter listening state while other smart speakers give up to wake up. A plurality of strategies may be set to solve the problem of simultaneously waking up and recognizing, for example by using a method of comparing the timestamps, where only one terminal having a wake-up timestamp with the earliest time can wake up its system and enter the listening state and then react to the subsequent instructions. Similarly, the problem of simultaneously waking up and recognizing can also be solved by using speech intensity, where the determination would be made by comparing the speech intensity received by each of the nodes, and only the node with the highest signal intensity wakes up itself and switches to the next state while other nodes give up to wake up themselves. These solutions will be described in detail in the following embodiments, which is not described repeatedly herein.

The above-described method can be applied to a scenario where multiple smart speakers coexist to quickly select one smart speaker that is most likely to be wakened by the user, by which the technical problem of a chaotic speech interaction caused by multiple smart speakers being wakened simultaneously is overcame, and one smart speaker that is most likely to be wakened by the user is quickly selected according to the identification information corresponding to the wake-up word, thereby obtaining the technical effects of improving efficiency and quality of the speech interaction and achieving better user experience.

Figure 2:
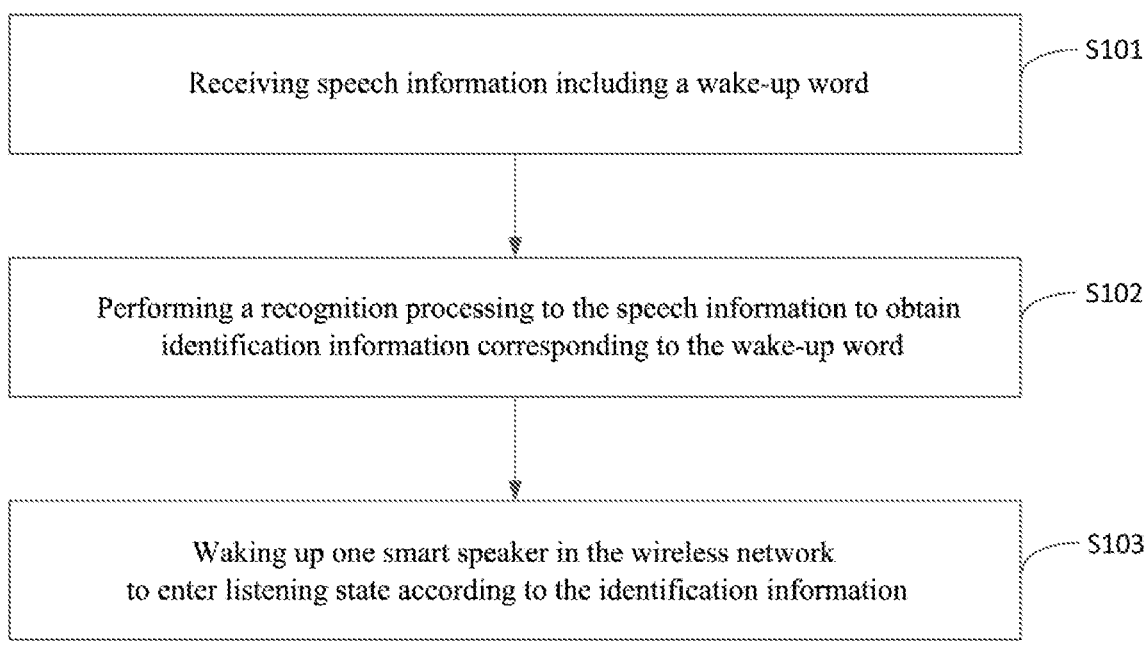
FIG. 2 is a schematic diagram according to a first embodiment of the present disclosure.

FIG. 2 is a schematic diagram according to the first embodiment of the present disclosure, as shown in FIG. 2, a method of the present embodiment may include:

S101, receiving speech information including a wake-up word.

The smart speaker wake-up method of the present embodiment may be applied to the wireless network including two or more smart speakers. The smart speakers have different wake-up words set therein according to different system configurations, such as "Xiaodu Xiaodu" "Xiaoai Classmate". The smart speaker can receive the speech information including the wake-up word, so as to enter the wake-up state. However, when there exist two or more smart speakers in the network, multiple smart speakers would response to the wake-up word simultaneously. The purpose of the present disclosure is to quickly select one smart speaker that is the most likely to be wakened by the user and avoid the chaotic speech interaction caused by multiple smart speakers being wakened simultaneously.

Selectively, the smart speaker in the wireless network is located in a preset geographic range, and there exist at least two smart speakers with different account numbers in the wireless network.

Specifically, currently when the user sends out the wake-up word and performs a query, if multiple machines login in by using the same account number, a cloud end would make a judgement according to position and the account number, so as to issue a following query consequence to only one of the speakers instead of all of the speakers with the same account number. However, when the multiple machines login in by using different account numbers, all of the multiple machines would be wakened and respond respectively to the query content, in this case, due to reasons of network transmission and terminal load, the site would become very noisy after the query content is issued, which leads to a bad user experience. The present disclosure can quickly select one smart speaker that is most likely to be wakened by the user among local choices, therefore it is applicable to a scenario in which at least two smart speakers with different account numbers exist in the wireless network, i.e. the method of the present disclosure can be adapted to waking up the local smart speaker no matter what kind of account numbers are used by multiple local smart speakers to login in.

S102, performing a recognition processing to the speech information to obtain identification information corresponding to the wake-up word.

In the present embodiment, the smart speaker performs the recognition processing to the speech information and obtains the identification information corresponding to the wake-up word. The identification information may include a timestamp of receiving the wake-up message by a speech algorithm database, speech intensity of the wake-up word, a node address and the like.

S103, waking up one smart speaker in the wireless network to enter listening state according to the identification information.

In the present embodiment, the smart speaker transmits the identification information to other smart speakers located in the same wireless network by way of broadcasting. Meanwhile, the smart speaker also receives the identification information transmitted by other smart speakers in the wireless network. Each node of the smart speakers can transmit this kind of information via the wireless network, where the size of package should comply with rules and requirements of the wireless network. And then, according to a preset rule, the smart speaker compares the identification information of itself with the received identification information transmitted by other smart speaker and make a determination, so that one smart speaker in the wireless network is wakened to enter listening state while other smart speakers give up to wake up. A plurality of strategies may be set to solve the problem of simultaneously waking up and recognizing, for example by using a method of comparing the timestamps, where only one terminal having a wake-up timestamp with the earliest time can wake up its system and enter the listening state and then react to the subsequent instructions. Similarly, the problem of simultaneously waking up and recognizing can also be solved by using speech intensity, where the determination would be made by comparing the speech intensity received by each of the nodes, and only the node with the highest signal intensity wakes up itself and switches to the next state while other nodes give up to wake up themselves. These solutions will be described in detail in the following embodiments, which is not described repeatedly herein.

It should be illustrated that the present embodiment defines no limitations to a sequence of transmitting the identification information by way of broadcasting via the smart speaker and receiving the identification information transmitted by other smart speakers in the wireless network, where, transmitting may be followed by receiving, receiving may be followed by transmitting, or transmitting and receiving may be simultaneously performed.

In the present embodiment, by means of receiving speech information including a wake-up word, performing a recognition processing to the speech information to obtain identification information corresponding to the wake-up word, and waking up one smart speaker in the wireless network to enter listening state according to the identification information, the smart speaker wake-up method may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

Figure 3:
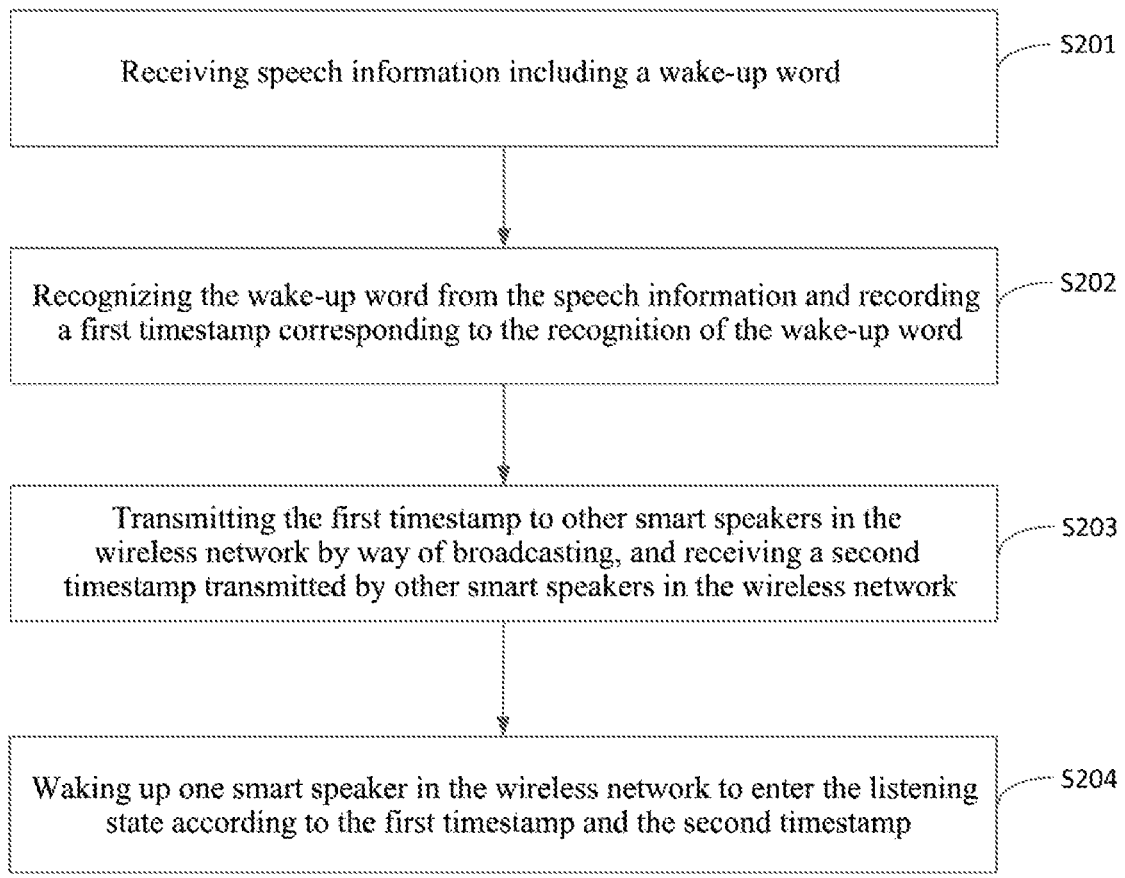
FIG. 3 is a schematic diagram according to a second embodiment of the present disclosure.

FIG. 3 is a schematic diagram according to the second embodiment of the present disclosure. As shown in FIG. 3, a method of the present embodiment may include:

S201, receiving speech information including a wake-up word.

S202, recognizing the wake-up word from the speech information and recording a first timestamp corresponding to the recognition of the wake-up word.

In the present embodiment, when the user sends out the speech information including the wake-up word, the smart speaker may recognize the wake-up word in the speech information via the speech algorithm, and then record time of recognizing the wake-up word as the first timestamp. All of the smart speakers in the wireless network would record the first timestamp for marking time at which the speech information is received and the wake-up word in the speech information is recognized.

S203, transmitting the first timestamp to other smart speakers in the wireless network by way of broadcasting, and receiving a second timestamp transmitted by other smart speakers in the wireless network.

In the present embodiment, the second timestamp is referred to as time corresponding to the recognition of the wake-up word by other smart speakers. When the wake-up word is recognized by the smart speaker from the speech information via the speech algorithm, the smart speaker may transmit the time corresponding to the recognition of the wake-up word (the first timestamp) to other smart speakers in the wireless network the way of broadcasting. Other smart speakers will record the received time corresponding to the recognition of the wake-up word as the second timestamp. When there are multiple smart speakers in the wireless network, the smart speaker may receive the time transmitted by other smart speakers for many times, therefore there may multiple second timestamps being recorded.

It should be illustrated that the present embodiment defines no limitations to a sequence of transmitting the first timestamp by way of broadcasting by the smart speaker and receiving the second timestamp transmitted by other smart speakers in the wireless network, where transmitting may be followed by receiving, receiving may be followed by transmitting, or transmitting and receiving may be simultaneously performed.

S204, waking up one smart speaker in the wireless network to enter the listening state according to the first timestamp and the second timestamp.

In the present embodiment, compare the time corresponding to the first timestamp with the time corresponding to the second timestamp, give up to wake up if the time of at least one second timestamp is earlier than the time of the first timestamp, and wake up to enter the listening state if none of the time of the second timestamp is earlier than the time of the first timestamp.

Specifically, each of the smart speakers in the wireless network implements a task of comparing the first timestamp with the second timestamp, gives up to wake up if the time of at least one second timestamp is earlier than the time of the first timestamp, i.e. the present smart speaker is not the first smart speaker in the network that recognizes the wake-up word; and wakes up to enter the listening state if none of the time of the second timestamp is earlier than the time of the first timestamp, i.e. the present smart speaker is the first smart speaker in the network that recognizes the wake-up word. By this way, the smart speaker can be wakened according to the time at which the wake-up word is obtained, an earlier time of obtaining the wake-up word illustrates a shorter distance between the smart speaker and the user. Therefore, the smart speaker closest to the user in the wireless network can be wakened to enter the listening state, thereby avoiding a chaotic speech interaction caused by multiple smart speakers being wakened simultaneously, improving efficiency and quality of speech interaction and achieving better user experience.

In the present embodiment, by means of receiving speech information including a wake-up word, performing a recognition processing to the speech information to obtain identification information corresponding to the wake-up word, and waking up one smart speaker in the wireless network to enter listening state according to the identification information, the smart speaker wake-up method may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

Figure 4:
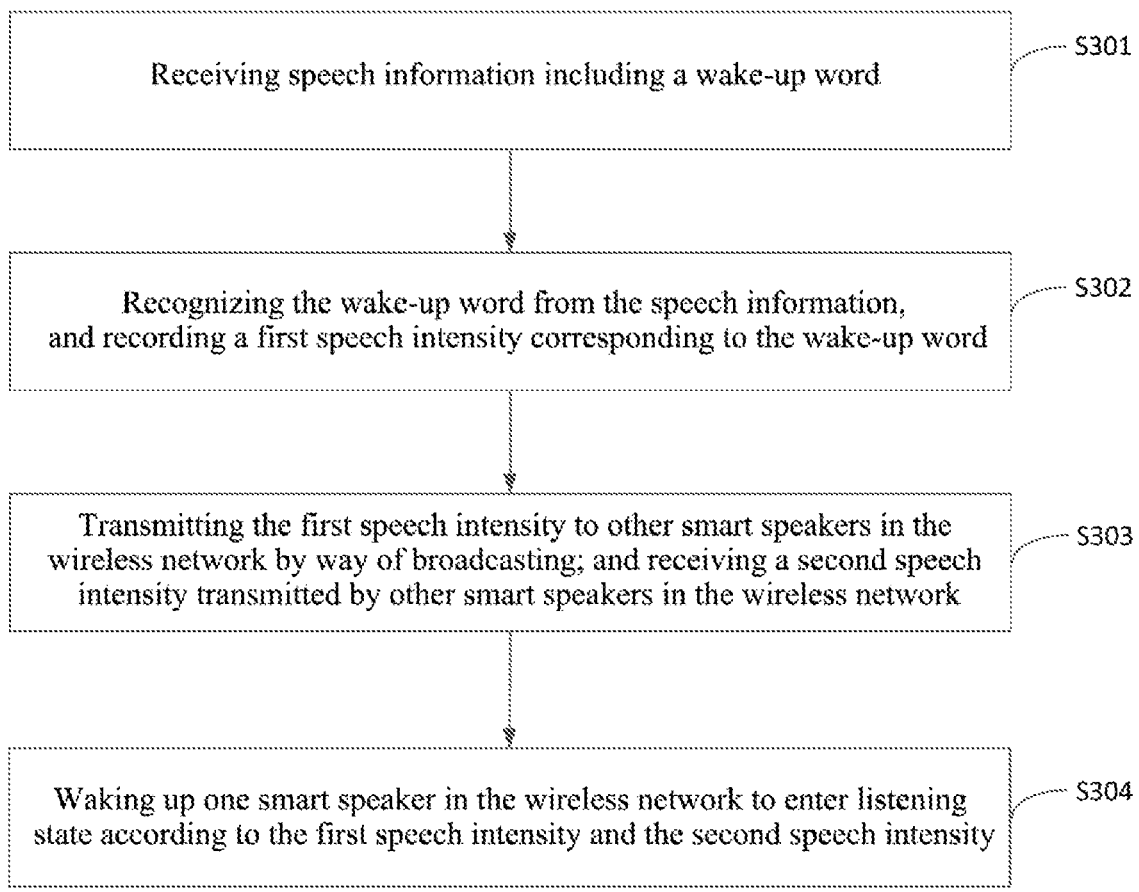
FIG. 4 is a schematic diagram according to a third embodiment of the present disclosure.

FIG. 4 is a schematic diagram according to the third embodiment of the present disclosure. As shown in FIG. 4, a method of the present embodiment may include:

S301, receiving speech information including a wake-up word.

S302, recognizing the wake-up word from the speech information, and recording a first speech intensity corresponding to the wake-up word.

In the present embodiment, when the user sends out the speech information including the wake-up word, the smart speaker may recognize the wake-up word in the speech information via the speech algorithm, and then record speech intensity of the wake-up word. All of the smart speakers in the wireless network would record the first speech intensity, where the first speech intensity represents the distance between the smart speaker and the user, the higher the speech intensity, the less the damage of the sound during transmission and the shorter the distance between the smart speaker and the user.

S303, transmitting the first speech intensity to other smart speakers in the wireless network by way of broadcasting; and receiving a second speech intensity transmitted by other smart speakers in the wireless network.

In the present embodiment, the second speech intensity is referred to as a speech intensity corresponding to the recognized wake-up word by other smart speakers. When the wake-up word is recognized from the speech information via the speech algorithm by the smart speaker, the smart speaker may transmit the speech intensity corresponding to the recognized wake-up word to other smart speakers in the wireless network by way of broadcasting. Other smart speakers would record the received speech intensity as the second speech intensity. When there are multiple smart speakers in the wireless network, each of the smart speakers may receive the second speech intensity transmitted by other smart speakers for many times, therefore there may multiple second speech intensity being recorded.

It should be illustrated that the present embodiment defines no limitations to a sequence of transmitting the first speech intensity by way of broadcasting by the smart speaker and receiving the second speech intensity transmitted by other smart speakers in the wireless network, where transmitting may be followed by receiving, receiving may be followed by transmitting, or transmitting and receiving may be simultaneously performed.

S304, waking up one smart speaker in the wireless network to enter listening state according to the first speech intensity and the second speech intensity.

In the present disclosure, compare the first speech intensity with the second speech intensity, give up to wake up if at least one the second speech intensity is larger than the first speech intensity, and wake up to enter the listening state if none of the second speech intensity is larger than the first speech intensity.

Specifically, each of the smart speakers in the wireless network implements a task of comparing the first speech intensity with the second speech intensity, gives up to wake up if at least one second speech intensity is larger than the first speech intensity, and wakes up to enter the listening state if none of the second speech intensity is larger than the first speech intensity. By this way, the smart speaker can be wakened according to the speech intensity of the obtained wake-up word, a higher speech intensity corresponding to the wake-up word illustrates a shorter distance between the smart speakers and the user. Therefore, the smart speaker closest to the user can be wakened from the wireless network to enter the listening state, thereby avoiding a chaotic speech interaction caused by multiple smart speakers being wakened simultaneously, improving efficiency and quality of speech interaction and achieving better user experience.

It should be illustrated that, the timestamp corresponding to the recognition of the wake-up word and the speech intensity of the recognized wake-up word may be combined, so as to quickly select one smart speaker that is most likely to be wakened by the user, the principle and implement steps thereof are the same as above-described embodiments, which isn't described repeatedly herein.

In the present embodiment, by means of receiving speech information including a wake-up word, performing a recognition processing to the speech information to obtain identification information corresponding to the wake-up word, and waking up one smart speaker in the wireless network to enter listening state according to the identification information, the smart speaker wake-up method may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

Figure 5:
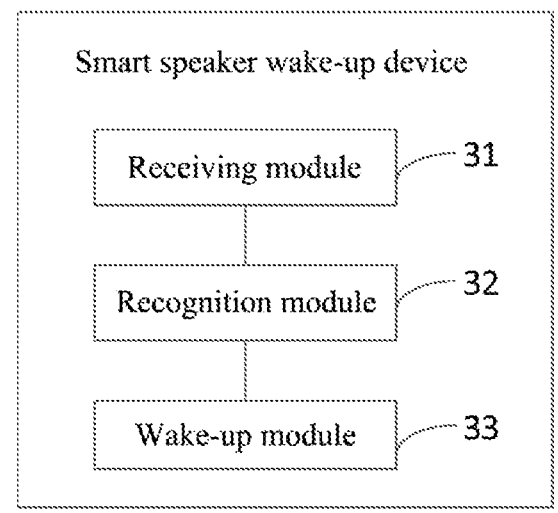
FIG. 5 is a schematic diagram according to a fourth embodiment of the present disclosure.

FIG. 5 is a schematic diagram according to the fourth embodiment of the present disclosure. As shown in FIG. 5, the device of the present embodiment is applied to the wireless network including two or more smart speakers, and may include:

a receiving module 31, configured to receive speech information including a wake-up word;

a recognition module 32, configure to perform a recognition processing to the speech information to obtain identification information corresponding to the wake-up word; and a wake-up module 33, configured to wake up one smart speaker in the wireless network to enter listening state according to the identification information.

In the present embodiment, by means of receiving speech information including a wake-up word, performing a recognition processing to the speech information to obtain identification information corresponding to the wake-up word, and waking up one smart speaker in the wireless network to enter listening state according to the identification information, the smart speaker wake-up method may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

In a possible design, the recognition module 32 is specifically configured to:

recognize the wake-up word from the speech information and record the first timestamp corresponding to the recognition of the wake-up word.

In the present embodiment, when the user sends out the speech information including the wake-up word, the smart speaker may recognize the wake-up word in the speech information via the speech algorithm, and then record time of recognizing the wake-up word as the first timestamp. All of the smart speakers in the wireless network would record the first timestamp for marking the time at which the speech information is received and the wake-up word in the speech information is recognized.

In a possible design, the wake-up module 33 is specifically configured to:

compare the time corresponding to the first timestamp with the time corresponding to the second timestamp;

give up to wake up if the time of at least one second timestamp is earlier than the time of the first timestamp; and wake up to enter the listening state if none of the time of the second timestamp is earlier than the time of the first timestamp.

In the present embodiment, each of the smart speakers in the wireless network implements the task of comparing the first timestamp with the second timestamp, gives up to wake up if the time of at least one second timestamp is earlier than the time of the first timestamp, and wakes up to enter the listening state if none of the time of the second timestamp is earlier than the time of the first timestamp. By this way, the smart speaker can be wakened according to the time at which the wake-up word is obtained, an earlier time of obtaining the wake-up word illustrates a shorter distance between the smart speaker and the user. Therefore, the smart speaker closest to the user can be wakened from the wireless network to enter the listening state, thereby avoiding a chaotic speech interaction caused by multiple smart speakers being wakened simultaneously, improving efficiency and quality of speech interaction and achieving better user experience.

In a possible design, the recognition module 32 is specifically configured to:

recognize the wake-up word from the speech information and record a first speech intensity corresponding to the wake-up word.

In the present embodiment, when the user sends out the speech information including the wake-up word, the smart speaker may recognize the wake-up word in the speech information via the speech algorithm, and then record the speech intensity of the recognized wake-up word. All of the smart speakers in the wireless network would record the first speech intensity, where the first speech intensity represents the distance between the smart speaker and the user, the higher the speech intensity, the less the damage of the sound during transmission and the shorter the distance between the smart speaker and the user.

In a possible module, the wake-up module 33 is specifically configured to:

compare the first speech intensity with the second speech intensity;

give up to wake up if at least one second speech intensity is larger than the first speech intensity; and wake up to enter the listening state if none of the second speech intensity is larger than the first speech intensity.

In the present disclosure, each of the smart speakers in the wireless network implements a task of comparing the first speech intensity with the second speech intensity, gives up to wake up if at least one second speech intensity is larger than the first speech intensity, and wakes up to enter the listening state if none of the second speech intensity is larger than the first speech intensity. By this way, the smart speaker can be wakened according to the speech intensity of the obtained wake-up word, a higher speech intensity corresponding to the wake-up word illustrates a shorter distance between the smart speakers and the user. Therefore, the smart speaker closest to the user can be wakened from the wireless network to enter the listening state, thereby avoiding a chaotic speech interaction caused by multiple smart speakers being wakened simultaneously, improving efficiency and quality of speech interaction and achieving better user experience.

In a possible design, the smart speaker in the wireless network is located in the preset geographic range, and there exist at least two smart speakers with different account numbers in the wireless network.

The present embodiment can be applied to the wireless network including two or more smart speakers, where the smart speakers in the wireless network are located in a preset geographic range, and there exist at least two smart speakers with different account numbers in the wireless network. By comparing the time at which the wake-up word is obtained or the speech intensity of the wake-up word, one smart speaker that is most likely to be wakened by the user can be selected quickly, avoiding a chaotic speech interaction caused by multiple smart speakers being wakened simultaneously, improving efficiency and quality of speech interaction and achieving better user experience.

The smart speaker wake-up device of the present embodiments, may be used to implement technical solutions of the method as shown in FIG. 2, FIG. 3 and FIG. 4, where the detailed implementation process and technical principle thereof are described in related description of the methods as shown in FIG. 2, FIG. 3 and FIG. 4, which isn't described repeatedly herein.

In the present embodiment, by means of receiving speech information including a wake-up word, performing a recognition processing to the speech information to obtain identification information corresponding to the wake-up word, and waking up one smart speaker in the wireless network to enter listening state according to the identification information, the smart speaker wake-up method may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

Figure 6:
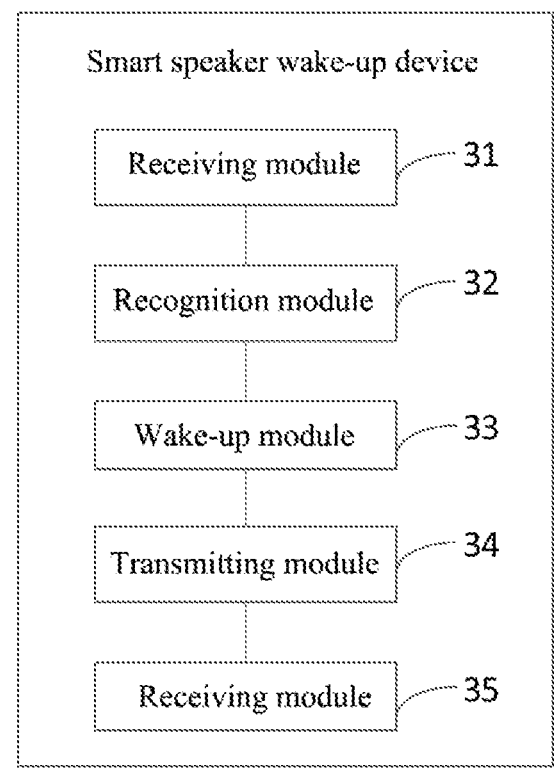
FIG. 6 is a schematic diagram according to a fifth embodiment of the present disclosure.

FIG. 6 is a schematic diagram according to the fifth embodiment of the present disclosure; as shown in FIG. 6, the device of the present embodiment based on the device as shown in FIG. 5, may also include:

a transmitting module 34; and a receiving module 35.

In a possible design, the transmitting module 34 is configured to transmit the first speech intensity to other smart speakers in the wireless network by way of broadcasting; and the receiving module 35 is configured to receive a second speech intensity transmitted by other smart speakers in the wireless network; where the second speech intensity is referred to as a speech intensity corresponding to a recognized wake-up word by other smart speakers.

In the present embodiment, when the wake-up word is recognized from the speech information via the speech algorithm by the smart speaker, the smart speaker may transmit the speech intensity corresponding to the recognized wake-up word to other smart speakers in the wireless network by way of broadcasting. Other smart speakers would record the received speech intensity as the second speech intensity. When there are multiple smart speakers in the wireless network, each of the smart speakers may receive the second speech intensity transmitted by other smart speakers for many times, therefore there may multiple second speech intensity being recorded.

In a possible design, the transmitting module 34 is configured to transmit the first timestamp to other smart speakers in the wireless network by way of broadcasting; and the receiving module 35 is configured to receive a second timestamp transmitted by other smart speakers in the wireless network, wherein the second timestamp is referred to as time corresponding to a recognition of the wake-up word by other smart speakers.

In the present embodiment, when the wake-up word is recognized from the speech information via the speech algorithm by the smart speaker, the smart speaker may transmit the time corresponding to the recognition of the wake-up word to other smart speakers in the wireless network by way of broadcasting. Other smart speakers will record the received time as the second timestamp. When there are multiple smart speakers in the wireless network, each of the smart speakers may receive the time transmitted by other smart speakers for many times, therefore there may multiple second timestamps being recorded.

The smart speaker wake-up device of the present embodiments, may be used to implement technical solutions of the method as shown in FIG. 2, FIG. 3 and FIG. 4, where the detailed implementation process and technical principle thereof are described in related description of the methods as shown in FIG. 2, FIG. 3 and FIG. 4, which isn't described repeatedly herein.

In the present embodiment, by means of receiving speech information including a wake-up word, performing a recognition processing to the speech information to obtain identification information corresponding to the wake-up word, and waking up one smart speaker in the wireless network to enter listening state according to the identification information, the smart speaker wake-up method may be applied to a scenario where multiple smart speakers coexist, so as to quickly select one smart speaker that is most likely to be wakened by the user, avoiding a chaotic speech interaction caused by multiple smart speakers being wakened simultaneously, improving efficiency and quality of speech interaction and achieving better user experience.

Figure 7:
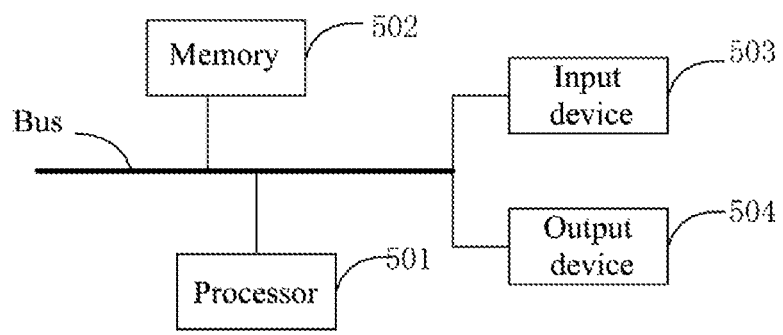
FIG. 7 is a block diagram of an electronic device for implementing a smart speaker wake-up method according to embodiments of the present disclosure.

FIG. 7 is a block diagram of an electronic device for implementing a smart speaker wake-up method according to embodiments of the present disclosure. As shown in FIG. 7, it is a block diagram of an electronic device for implementing a method for waking up the smart speaker shown as FIG. 7. The electronic device is aimed at representing digital computers in various forms, such as a laptop computer, a desk computer, a worktable, a personal digital assistant, a server, a blade server, a large-scale computer and other appropriate computers. The electronic device may also represent various mobile devices in various forms, such as a personal digital assistant, a cellular phone, an intelligent phone, a wearable device and other similar computer devices. Components, connection and relationship thereof and function thereof illustrated herein are merely exemplary, which is not intended to limit the implementation of the present disclosure as described and/or required herein.

As shown in FIG. 7, the electronic device includes: one or more processor 501, a memory 502 and a port configured to connect all components, where a high-speed port and a low-speed port are included therein. All the components are mutually connected by using different buses, and can be disposed on a common mother board or disposed in other ways according to demands. The processor can perform a processing to an instruction executed in the electronic device which includes instruction stored in or at the memory to display image information of GUI on an external input/output device (such as a display device coupled to the port). In other implementation, if needs, multiple processors and/or multiple buses may be used together with multiple memories. Similarly, multiple electronic devices may be connected, each device provides part of essential operations (for example, as a server matrix, a group of blade severs or multi-processor system). A processor 501 is taken as an example in FIG. 7.

The memory 502 is a non-instantaneous computer readable storage medium provided in the present disclosure. Where the memory stores an instruction that can be executed by at least one processor, so as to make the at least one processor execute the method for waking up the electronic device shown in FIG. 7 of the present disclosure. The non-instantaneous computer readable storage medium of the present disclosure has a computer instruction stored therein, the computer instruction is configured to make the computer execute the method for waking up the electronic device shown in FIG. 7 of the present disclosure.

The memory 502, as a non-instantaneous computer readable storage medium, may be configured to store a non-instantaneous software program, an non-instantaneous computer executable program and module, such as a program instruction/module corresponding to the method for waking up the electronic device shown in FIG. 7 in embodiments of the present disclosure. By running the non-instantaneous software program, instruction and module stored in the memory 502, the processor 501 implement various functional applications and data processing of the server, i.e. implement the method for waking up the electronic device shown in FIG. 7 in above-described embodiments.

The memory 502 may include a program storage area and a data storage area, where the program storage area may have an application program demanded by at least one function of an operation system stored therein; the data storage area may have data established according to the utilization of the electronic device for implementing the smart speaker wake-up method as shown in FIG. 7. In addition, the memory 502 may include a high-speed random access memory, and may also include a non-instantaneous memory, such as at least one of a disk memory component, a flash memory component or other non-instantaneous solid memory components. In some embodiments, the memory 502 selectively includes memories which are remotely disposed relative to the processor 501, these remote memories may be connected to the electronic device for implementing smart speaker wake-up method of FIG. 7 via the network. The examples of above-described network include but not limited to the internet, company internal network, local area network, mobile communication network and a combination thereof.

The electronic device for implementing the smart speaker wake-up method of FIG. 7 may also include: an input device 503 and an output device 504. The processor 501, the memory 502, the input device 503 and the output device 501 may be connected via the buses or other connection means, a connection via the buses is taken as an example in FIG. 7.

The input device 503 can receive inputted number or character information, and generate a key signal input related to user settings and function control of the electronic device for implementing the smart speaker wake-up method of FIG. 7, for example an input device like a touch screen, a keypad, a mouse, a trackpad, a touch pad, an indication rod, one or more mouse buttons, a trackball, an operation rod and the like. The input device 504 may include a display device, an auxiliary lighting device (for example, LED) and a haptic feedback device (for example, a vibration motor) and the like. The display device may include but not limited to a liquid crystal displayer (LCD), a light emitting diode (LED) displayer and a plasma displayer. In some implementations, the display device may be the touch screen.

Various implementations of the system and technology described herein may be implemented in a digital electronic circuit system, an integration circuit system, a specialized application specific integrated circuit (ASIC), GPU (graphics processing unit), FPGA (field programmable gate array) device, computer hardware, solid ware, software and/or a combination thereof. These various implementations may include: implemented in one or more computer programs, the one or more computer programs may be executed and/or explained in a programmable system including at least one programmable processor, the programmable processor may be a specific or common programmable processor, which can receive data and instructions from a storage system, at least one input device and at least one output device and transmit the data and the instructions to the storage system, the at least one device and the at least one output device.

These computer programs (which is also referred to as program, software, software application or code) include a machine instruction of the programmable processor, and these computer programs may be implemented by using an advanced process and/or object-oriented programing language and/or assembly/machine language. As used herein, the terms of "machine readable medium" and "computer readable medium" are referred to as any computer program product, device and/or device (such as magnetic disk, light disk, memory, programmable logic device (PLD)) that are configured to provide the machine instruction and/or data to the programmable processor, including a machine readable medium which receives the machine instruction as a machine readable signal. The term of "machine readable" is referred to as any signal configured to provide the machine instruction and/or data to the programmable processor.

In order to provide an interaction with the user, the system and technology described herein may be implemented on the computer, where the computer has: a display device configured to display information to the user (for example, a cathode-ray tube (CRT) or a liquid crystal displayer (LCD) monitor); and a keyboard and a pointing device (for example, a mouse or a trackball), the user may provide input to the computer via the keyboard and the pointing device. Other type of devices may also provide the interaction with the user; such as a feedback provided to the user may be a sensory feedback in any form (for example, visual feedback, auditory feedback or tactile feedback); and any form (including sound input, voice input or tactile input) may be used to receive the input from the user.

The system and technology described herein may be implemented in a computer system including a background component (for example, as a data server), or a computer system including a middleware component (for example disclosure server), or a computer system including a front end component (for example a user computer having an image user interface or a network browser, the user can implement an interaction with the system and technology described herein via the image user interface or the network browser), or a computer system including any combination of this kind of background component, middleware component and front end component. A digital data communication in any form or having any medium (for example, a communication network) may be used for a mutual connection of the components of the system. Examples of the communication network include: local area network (LAN), wide area network (WAN) and the internet.

The computer system may include a client terminal and a server. The client terminal and the server are generally far away from each other and perform the interaction via the communication network. A relationship between the client terminal and the server is generated by operating computer programs that have a client terminal-server relationship with each other on corresponding computers.

It should be understood that the above-described flow path in various forms may be used for rearranging, adding or deleting the steps. For example, each step in the present disclosure may be implemented concurrently, or orderly, or implemented in different order, as long as the expected consequence of the technical solution disclosed in the present disclosure can be achieved, to which no limitation is defined herein.

The above-described implementations define no limitation to the protective scope of the present disclosure. Those skilled in the art should understand that according to design requirements and other factors, various modifications, combinations, sub-combinations and replacements may be made. Any modifications, equivalent replacements and improvements in the scope of spirit and principle of the present disclosure should be included in the protective scope of the present disclosure.

What is claimed is:

1. A smart speaker wake-up method, which is applied to a wireless network comprising two or more smart speakers, comprising:
   receiving speech information comprising a wake-up word;
   performing a recognition processing to the speech information to obtain identification information corresponding to the wake-up word, wherein the identification information comprises time at which the wake-up word is recognized by any one smart speaker in the wireless network or a speech intensity corresponding to the wake-up word is recognized by any one smart speaker in the wireless network; and
   waking up one smart speaker in the wireless network to enter listening state according to the time at which the wake-up word is recognized by any one smart speaker in the wireless network and time at which the wake-up word is recognized by other smart speakers in the wireless network or according to the speech intensity corresponding to the wake-up word is recognized by any one smart speaker in the wireless network and a speech intensity corresponding to the wake-up word is recognized by other smart speaker in the wireless network.

2. The method according to claim 1, wherein the performing a recognition processing to the speech information to obtain identification information corresponding to the wake-up word, comprises:
   recognizing the wake-up word from the speech information and recording a first timestamp corresponding to the recognition of the wake-up word.

3. The method according to claim 2, wherein before the waking up one smart speaker in the wireless network to enter listening state according to the identification information, also comprising:
   transmitting the first timestamp to other smart speakers in the wireless network by way of broadcasting; and
   receiving a second timestamp transmitted by other smart speakers in the wireless network, wherein the second timestamp is referred to as time corresponding to a recognition of the wake-up word by other smart speakers.

4. The method according to claim 3, wherein the waking up one smart speaker in the wireless network to enter listening state according to the identification information, comprises:
   comparing the time corresponding to the first timestamp with the time corresponding to the second timestamp;
   giving up to wake up if the time of at least one second timestamp is earlier than the time of the first timestamp; and
   waking up to enter the listening state if none of the time of the second timestamp is earlier than the time of the first timestamp.

5. The method according to claim 1, wherein the performing a recognition processing to the speech information to obtain identification information corresponding to the wake-up word, comprises:
   recognizing the wake-up word from the speech information, and recording a first speech intensity corresponding to the wake-up word.

6. The method according to claim 5, wherein before the waking up one smart speaker in the wireless network to enter listening state according to the identification information, also comprising:

transmitting the first speech intensity to other smart speakers in the wireless network by way of broadcasting; and
receiving a second speech intensity transmitted by other smart speakers in the wireless network, wherein the second speech intensity is referred to as a speech intensity corresponding to a recognized wake-up word by other smart speakers.

7. The method according to claim 6, wherein the waking up one smart speaker in the wireless network to enter listening state according to the identification information, comprises:
comparing the first speech intensity with the second speech intensity;
giving up to wake up if at least one second speech intensity is larger than the first speech intensity; and
waking up to enter the listening state if none of the second speech intensity is larger than the first speech intensity.

8. The method according to claim 1, wherein the smart speaker in the wireless network is located in a preset geographic range, and there exist at least two smart speakers with different account numbers in the wireless network.

9. A smart speaker system, comprising:
at least one processor; and
a memory in communication connection with the at least one processor; wherein,
the memory stores instruction executable by the at least one processor, the instruction is executed by the at least one processor, so as to make the at least one processor for executing the following steps while being applied to a wireless network comprising two or more smart speakers:
receiving speech information comprising a wake-up word;
performing a recognition processing to the speech information to obtain identification information corresponding to the wake-up word, wherein the identification information comprises time at which the wake-up word is recognized by any one smart speaker in the wireless network or a speech intensity corresponding to the wake-up word is recognized by any one smart speaker in the wireless network; and
determining whether to wake up the smart speaker itself to enter listening state according to the time at which the wake-up word is recognized by any one smart speaker in the wireless network and time at which the wake-up word is recognized by other smart speakers in the wireless network or according to the speech intensity corresponding to the wake-up word is recognized by any one smart speaker in the wireless network and a speech intensity corresponding to the wake-up word is recognized by other smart speaker in the wireless network.

10. The smart speaker according to claim 9, wherein the performing a recognition processing to the speech information to obtain identification information corresponding to the wake-up word, comprises:
recognizing the wake-up word from the speech information and recording a first timestamp corresponding to the recognition of the wake-up word.

11. The smart speaker according to claim 10, wherein before determining whether to wake up the smart speaker itself to enter listening state according to the identification information, also comprising:
transmitting the first timestamp to other smart speakers in the wireless network by way of broadcasting; and
receiving a second timestamp transmitted by other smart speakers in the wireless network, wherein the second timestamp is referred to as time corresponding to a recognition of the wake-up word by other smart speakers.

12. The smart speaker according to claim 11, wherein determining whether to wake up the smart speaker itself to enter listening state according to the identification information, comprises:
comparing the time corresponding to the first timestamp with the time corresponding to the second timestamp;
giving up to wake up if the time of at least one second timestamp is earlier than the time of the first timestamp; and
waking up to enter the listening state if none of the time of the second timestamp is earlier than the time of the first timestamp.

13. The smart speaker according to claim 10, wherein the smart speaker in the wireless network is located in a preset geographic range, and there exist at least two smart speakers with different account numbers in the wireless network.

14. The smart speaker according to claim 9, wherein the performing a recognition processing to the speech information to obtain identification information corresponding to the wake-up word, comprises:
recognizing the wake-up word from the speech information, and recording a first speech intensity corresponding to the wake-up word.

15. The smart speaker according to claim 14, wherein before determining whether to wake up the smart speaker itself to enter listening state according to the identification information, also comprising:
transmitting the first speech intensity to other smart speakers in the wireless network by way of broadcasting; and
receiving a second speech intensity transmitted by other smart speakers in the wireless network, wherein the second speech intensity is referred to as a speech intensity corresponding to a recognized wake-up word by other smart speakers.

16. The smart speaker according to claim 15, wherein determining whether to wake up the smart speaker itself to enter listening state according to the identification information, comprises:
comparing the first speech intensity with the second speech intensity;
giving up to wake up if at least one second speech intensity is larger than the first speech intensity; and
waking up to enter the listening state if none of the second speech intensity is larger than the first speech intensity.

17. The smart speaker according to claim 14, wherein the smart speaker in the wireless network is located in a preset geographic range, and there exist at least two smart speakers with different account numbers in the wireless network.

18. The smart speaker according to claim 9, wherein the smart speaker in the wireless network is located in a preset geographic range, and there exist at least two smart speakers with different account numbers in the wireless network.

19. A non-transitory computer readable storage medium having a computer instruction stored therein, wherein, the computer instruction is configured to make the computer execute the method according to claim 1.

20. A smart speaker wake-up method, comprising:
receiving speech information; and
waking up, if the speech information comprises a wake-up word, one smart speaker in a wireless network to enter listening state according to identification information corresponding to the wake-up word, wherein the identification information comprises time at which the wake-up word is recognized by any one smart speaker in the wireless network or a speech intensity corresponding to the wake-up word is recognized by any one smart speaker in the wireless network;

wherein the waking up one smart speaker in a wireless network to enter listening state according to identification information corresponding to the wake-up word, comprises:

waking up one smart speaker in the wireless network to enter listening state according to the time at which the wake-up word is recognized by any one smart speaker in the wireless network and time at which the wake-up word is recognized by other smart speakers in the wireless network or according to the speech intensity corresponding to the wake-up word is recognized by any one smart speaker in the wireless network and a speech intensity corresponding to the wake-up word is recognized by other smart speaker in the wireless network.

\* \* \* \* \*